United States Patent
Przybysz et al.

(10) Patent No.: US 9,258,179 B2
(45) Date of Patent: *Feb. 9, 2016

(54) FAILURE RECOVERY IN AN IP MULTIMEDIA SUBSYSTEM NETWORK

(71) Applicant: Telefonaktiebolaget LM Ericsson (publ), Stockhom (SE)

(72) Inventors: Hubert Przybysz, Hägersten (SE); Timo Forsman, Älvsjö (SE); Germán Blanco, Paracuellos del Jarama (ES); Lars Lövsén, Göteborg (SE); Gunnar Rydnell, Västra Frölunda (SE); Kaj Johansson, Mölndal (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 142 days.

This patent is subject to a terminal disclaimer.

(21) Appl. No.: 13/860,835

(22) Filed: Apr. 11, 2013

(65) Prior Publication Data

US 2013/0194910 A1    Aug. 1, 2013

Related U.S. Application Data

(63) Continuation of application No. 12/680,426, filed as application No. PCT/EP2007/060346 on Sep. 28, 2007, now Pat. No. 8,503,312.

(51) Int. Cl.
*H04J 1/16* (2006.01)
*H04L 29/14* (2006.01)
(Continued)

(52) U.S. Cl.
CPC ........... *H04L 29/14* (2013.01); *H04L 43/50* (2013.01); *H04L 65/1016* (2013.01); *H04L 65/80* (2013.01); *H04L 69/40* (2013.01)

(58) Field of Classification Search
CPC ..... H04L 29/14; H04L 65/1016; H04L 43/50; H04L 69/40; H04L 65/80
USPC .......... 370/216–235, 241–252, 352, 353, 401
See application file for complete search history.

(56) References Cited

U.S. PATENT DOCUMENTS

2003/0060210 A1* 3/2003 Ravishankar et al. ........ 455/452
2005/0262561 A1* 11/2005 Gassoway .................... 726/22
(Continued)

FOREIGN PATENT DOCUMENTS

CN    101 018 160 A    8/2007
EP    1 914 937 A1    4/2008
(Continued)

OTHER PUBLICATIONS

3GPP 3rd Generation Partnership Project Technical Specification Group Core Networks and Terminals; Study on IMS Restoration Procedures (Release 8.t 3GPP TR 23.820 v0.2.0, Sep. 6, 2007.
(Continued)

*Primary Examiner* — Kan Yuen

(57) ABSTRACT

A method is provided for facilitating recovery from the failure of a P-CSCF within an IP multimedia Subsystem network. A gateway, such as a GGSN, monitors signals arriving at the gateway from the P-CSCF and provides an indication if the monitored signals become unacceptable, for example because of an interruption in the signals. The gateway responds by signalling the unavailability of the P-CSCF to user equipment, which was associated with the P-CSCF during a previous registration with the IMS network. In response, for example, the user equipment affected by the failure may request re-registration with the IMS network using a different available P-CSCF.

50 Claims, 3 Drawing Sheets

(51) Int. Cl.
*H04L 12/26* (2006.01)
*H04L 29/06* (2006.01)

(56) References Cited

U.S. PATENT DOCUMENTS

| | | | | |
|---|---|---|---|---|
| 2006/0046714 | A1* | 3/2006 | Kalavade | 455/428 |
| 2007/0177617 | A1* | 8/2007 | Noh et al. | 370/401 |
| 2007/0275710 | A1* | 11/2007 | Mayer et al. | 455/423 |
| 2008/0019275 | A1* | 1/2008 | Mudireddy et al. | 370/235 |
| 2008/0144605 | A1* | 6/2008 | Qiu et al. | 370/352 |
| 2008/0320149 | A1* | 12/2008 | Faccin | 709/228 |

FOREIGN PATENT DOCUMENTS

| | | |
|---|---|---|
| EP | 1914937 A1 | 4/2008 |
| JP | H07-046246 A | 2/1995 |
| JP | 2003-515969 A | 7/2003 |
| JP | 2004-533165 A | 10/2004 |
| JP | 2007-013612 A | 1/2007 |

OTHER PUBLICATIONS

3GPP. 3$^{rd}$ Generation Partnership Project: Technical Specification Group Services and System Aspects; Network Architecture (Release 8). 3GPP TS 23.002 v8.00 (Jun. 2007). Jun. 19, 2007.

3GPP. 3$^{rd}$ Generation Partnership Project; Technical Specification Group Services and System Aspects; Service Requirements for the Internet Protocol (IP) Multimedia Core Network Subsystem; Stage 1 (Release 8). 3GPP TS 22.228 v8.1.0 (Sep. 2006). Oct. 4, 2006.

3GPP. 3$^{rd}$ Generation Partnership Project; Technical Specification Group Services and System Aspects; IP Multimedia Subsystem (IMS); Stage 2 (Release 8). 3GPP TS 23.228 v8.1.0 (Jun. 2007). Jun. 19, 2007.

3GPP. 3. Generation Partnership Project; Technical Specification Group Core Network and Terminals; IP Multimedia Call Control Protocol Based on Session Initiation Protocol (SIP) and Session Description Protocol (SOP); Stage 3 (Release 8). 3GPP TS 24.229 v8.0.0 (Jun. 2007). Jun. 22, 2007.

3GPP. 3$^{rd}$ Generation Partnership Project; Technical Specification Group Core Network and Terminals; IP Multimedia (IM) Subsystem Cx and Dx Interfaces; Signalling Flows and Message Contents (Release 7). 3GPP TS 29.228 v7.6.0 (Jun. 2007). Jul. 2, 2007.

3GPP. 3$^{rd}$ Generation Partnership Project; Technical Specification Group Core Network and Terminals; Cx and Ox Interfaces Based on the Diameter Protocol; Protocol Details (Release 7). 3GPP TS 29.229 v7.5.0 (Mar. 2007).

3GPP. 3$^{rd}$ Generation Partnership Project; Technical Specification Group Core Network and Terminals; IP Multimedia (IM) Subsystem Sh Interface; Signalling Flows and Message Contents (Release 7). 3GPP TS 29.328 v7.6.0 (Jun. 2007). Jul. 2, 2007.

3GPP. 3$^{rd}$ Generation Partnership Project; Technical Specification Group Core Network and Terminals; Sh Interface Based on the Diameter Protocol; Protocol Details (Release 7). 3GPP TS 29.329 v7.4.0 (Sep. 2007). Sep. 25, 2007.

3GPP. 3$^{rd}$ Generation Partnership Project; Technical Specification Group Core Network and Terminals; Mobile Radio Interface Layer 3 Specification; Core Network Protocols; Stage 3 (Release 7). 3GPP TS 24.008 v7.9.0 (Sep. 2007). Sep. 25, 2007.

Haverty, J. Thoughts on Interactions in Distributed Services. Network Working Group. RFC 722. Sep. 1976.

3GPP. 3$^{rd}$ Generation Partnership Project; Technical Specification Group Core Network and Terminals; Interworking between the Public Land Mobile Network (PLMN) Supporting Packet Based Services and Packet Data Networks (PDN) (Release 7). 3GPP TS .29.061 v7.4.0 (Jun. 2007). Jun. 22, 2007.

Kenji Abe, et al. "An Improvement of Network Server Availability Based on the IP Multimedia Subsystem Architecture." IEICE Technical Report NS2005-132. The Institute of Electronics, Information and Communication Engineers. Nov. 2005. vol. 105, No. 405, pp. 99-101. Japan.

TSG CT WG4: "FS WID for IMS Restoration Procedures". 3GPP TSG CT Plenary Meeting #35. CP-070031. Mar. 7-9, 2007. Limassol, Cyprus.

Jennings, et al: "Managing Client Initiated Connections in the Session Initiation Protocol (SIP) draft-ietf-sip-outbound-10". Network Working Group. Internet-Draft. Jul. 5, 2007.

Haverty, Jack. Network Working Group, Request for Comments: 722, NIC# 36806. Sep. 1976.

* cited by examiner

FAILURE RECOVERY IN AN IP MULTIMEDIA SUBSYSTEM NETWORK

CLAIMING BENEFIT OF PRIOR FILED U.S. APPLICATION

This application is a continuation application of U.S. patent application Ser. No. 12/680,426, filed Aug. 26, 2010, now U.S. Pat. No. 8,503,312, which is a 371 of PCT/EP2007/060346 filed on Sep. 28, 2007. The contents of these documents are hereby incorporated by reference herein.

TECHNICAL FIELD

The present invention relates to failure recovery in an IP Multimedia Subsystem network and in particular to a method and apparatus for enabling recovery from failure of a Proxy Call Session Control Function.

BACKGROUND

IP Multimedia services provide a dynamic combination of voice, video, messaging, data, etc. within the same session. By growing the number of basic applications and the media that it is possible to combine, the number of services offered to the end users will grow, and the inter-personal communication experience will be enriched. This will lead to a new generation of personalised, rich multimedia communication services, including so-called "combinational IP Multimedia" services.

The UMTS (Universal Mobile Telecommunications System) is a third generation wireless system designed to provide higher data rates and enhanced services to subscribers. UMTS is a successor to the Global System for Mobile Communications (GSM), with an important evolutionary step between GSM and UMTS being the General Packet Radio Service (GPRS). GPRS introduces packet switching into the GSM core network and allows direct access to packet data networks (PDNs). This enables high-data rate packet switch transmissions well beyond the 64 kbps limit of ISDN through the GSM call network, which is a necessity for UMTS data transmission rates of up to 2 Mbps. UMTS is standardised by the $3^{rd}$ Generation Partnership Project (3GPP) which is a conglomeration of regional standards bodies such as the European Telecommunication Standards Institute (ETSI), the Association of Radio Industry Businesses (ARIB) and others. See 3GPP TS 23.002 for more details.

The UMTS architecture includes a subsystem known as the IP Multimedia Subsystem (IMS) for supporting traditional telephony as well as new IP multimedia services (3GPP TS 22.228, TS 23.228, TS 24.229, TS 29.228, TS 29.229, TS 29.328 and TS 29.329 Releases 5 to 7). IMS provides key features to enrich the end-user person-to-person communication experience through the use of standardised IMS Service Enablers, which facilitate new rich person-to-person (client-to-client) communication services as well as person-to-content (client-to-server) services over IP-based networks. The IMS is able to connect to both PSTN/ISDN (Public Switched Telephone Network/Integrated Services Digital Network) as well as the Internet.

The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly. The 3GPP has chosen SIP for signalling between a User Equipment (UE) and the IMS as well as between the components within the IMS.

Specific details of the operation of the UMTS communications network and of the various components within such a network can be found from the Technical Specifications for UMTS that are available from http://www.3gpp.org. Further details of the use of SIP within UMTS can be found from the 3GPP Technical Specification TS 24.229.

FIG. 1 (PRIOR ART) of the accompanying drawings illustrates schematically how the IMS fits into the mobile network architecture in the case of a GPRS/PS access network (IMS can of course operate over other access networks). Call/Session Control Functions (CSCFs) operate as SIP proxies within the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a SIP request received from a SIP terminal via a P-CSCF.

A user registers with the IMS using the specified SIP REGISTER method. This is a mechanism for attaching to the IMS and announcing to the IMS the address at which a SIP user identity can be reached. In 3GPP, when a SIP terminal performs a registration, the IMS authenticates the user, and allocates a S-CSCF to that user from the set of available S-CSCFs. Whilst the criteria for allocating S-CSCFs is not specified by 3GPP, these may include load sharing and service requirements. It is noted that the allocation of an S-CSCF is key to controlling (and charging for) user access to IMS-based services. Operators may provide a mechanism for preventing direct user-to-user SIP sessions which would otherwise bypass the S-CSCF.

During the registration process, it is the responsibility of the I-CSCF to select an S-CSCF if an S-CSCF is not already selected. The I-CSCF receives the required S-CSCF capabilities from the home network's Home Subscriber Server (HSS), and selects an appropriate S-CSCF based on the received capabilities. The SIP REGISTER message is forwarded to the selected S-CSCF, which adds its identity into the SIP Service Route header. When the P-CSCF receives the 200 OK from the S-CSCF, it learns the SIP identity from the Service Route header. It is noted that S-CSCF allocation is also carried out for a user by the I-CSCF in the case where the user is called by another party, and the user is not currently allocated an S-CSCF. This is referred to as the "terminating" call case.

Within the IMS service network, Application Servers (ASs) are provided for implementing IMS service functionality. Application Servers provide services to end-users users in an IMS system, and may be connected either as end-points over the 3GPP defined Mr interface, or "linked in" by an S-CSCF over the 3GPP defined ISC interface. In the latter case, Initial Filter Criteria (IFC) are used by an S-CSCF to determine which Applications Servers should be "linked in" during a SIP Session establishment. Different IFCs may be applied to different call cases. The IFCs are received by the S-CSCF from an HSS during the IMS registration procedure as part of a user's User Profile. Certain Application Servers will perform actions dependent upon subscriber identities (either the called or calling subscriber, whichever is "owned" by the network controlling the Application Server). For example, in the case of call forwarding, the appropriate (terminating) application server will determine the new terminating party to which a call to a given subscriber will be forwarded. In the case that an IFC indicates that a SIP message received at the S-CSCF should be forwarded to a particular SIP AS that AS is added into the message path. Once the SIP message is returned by the AS to the S-CSCF, it is forwarded on towards its final destination, or forwarded to another AS if this is indicated in the IFCs.

Current IMS Core specifications do not include procedures for the recovery to a consistent state after a failure in a network element.

The P-CSCF that the user equipment contacts at IMS registration inserts its own SIP URI in the SIP Path header so as to stay in the SIP signalling path for the period of registration with the IMS.

When the user is contacted as the terminating end (e.g. as the B-party of a voice call), the IMS requires that the terminal can be contacted using the P-CSCF's SIP URI as inserted at registration. Should there be a failure in the communication, the latency until the IMS gives up further attempts may be a matter of a minute or so. After that period, a SIP timeout error will be returned to the A-Party. All terminating SIP requests directed to all users handled by the unreachable P-CSCF will fail until those users initiate a new registration. This scenario is described in 3GPP TR 23.820 clause 5.3.3.

In existing solutions, the failure of a P-CSCF means a lapse of time in which the user is not reachable while having the perception of being connected to the IMS Core Network. This lapse will last until a SIP request is initiated from the user terminal, which may be as long as a re-registration period. Currently, re-registration timers in the IMS range from 30 minutes to several hours, and that may be too much time to have this condition for some users, even taking into account how unlikely the event of a P-CSCF failure is.

A "heart-beat" signalling or other supervision performed by the user equipment and defined to indicate to the user equipment that contact with the IMS core (and thus the registration) has been lost would solve this problem. In particular, this applies for the case when the P-CSCF is at fault or has restarted. However, such signalling would quickly drain the battery of mobile user equipment and would consume unacceptable amounts of radio resources.

SUMMARY

According to a first aspect of the invention, there is provided a method of facilitating recovery from a failure of a proxy Call Session Control Function within an IP multimedia subsystem network, the method comprising the steps of:
  monitoring, in a gateway, signals arriving at the gateway from the proxy Call Session Control Function;
  providing an indication in the gateway if the monitored signals become unacceptable; and
  performing an action in the gateway, in response to the indication, which signals the unavailability of the proxy Call Session Control Session Control Function to the or each user equipment which is associated with the proxy Call Session Control Function.

The providing step may provide the indication after receiving an explicit indication of unreachability from a transport network. The providing step may provide the indication after a change in the monitored signals which is characteristic of unavailability or unreachability of a sending node.

The providing step may provide the indication in response to an interruption in the monitored signals. The providing step may provide the indication after a predetermined delay from receipt of the monitored signals. The predetermined delay may be a function of signal traffic level from the or each user equipment via the gateway intended for the proxy Call Session Control Function.

The predetermined delay may be a function of the number of user equipment instances associated with the proxy Call Session Control Function. The predetermined delay may be a function of signalling traffic measurement performed in real time and/or prior measurements. The predetermined delay may be a function of signalling traffic predictions. The predetermined delay may be a combination of any of these functions.

The monitoring step may comprise sending to the proxy Call Session Control Function a signal requiring the proxy Call Session Control Function to send a response to the gateway and the providing step may provide the indication in response to failure to receive, at the gateway, a predetermined number of responses. The response requiring signal may be sent if the signal traffic between the gateway and the proxy Call Session Control Function is below a predetermined level.

The gateway may be a gateway support node for a general packet radio service. The action performing step may comprise performing the action by means of session management signalling. The action may comprise any one of:
  removing traffic flow templates corresponding to the signalling IP flows to the or each user equipment;
  deleting a PDP context carrying signalling IP flows to the or each user equipment;
  sending notification in GPRS session management;
  sending an ICMP message indicating that the destination IP address is unreachable;
  informing the or each user equipment of which proxy Call Session Control Functions are available.

The or each user equipment may respond to the action by performing a re-registration with the IP multimedia subsystem including associating the user equipment with another proxy Call Session Control Function.

The monitoring step may comprise monitoring, in the gateway, signals arriving at the gateway from each proxy Call Session Control Function whose address is stored at the gateway.

According to a second aspect of the invention, there is provided an apparatus configured to operate as a gateway within an IP multimedia subsystem network, the apparatus comprising:
  an input for receiving signals arriving from a proxy Call Session Control Function;
  means for monitoring the signals received from the proxy Call Session Control Function;
  means for providing an indication if the monitored signals become unacceptable; and
  means for performing an action, in response to the indication, which signals the unavailability of the proxy Call Session Control Function to the or each user equipment which was associated with the proxy Call Session Control Function during a previous registration of the user equipment with the IP multimedia subsystem network.

DETAILED DESCRIPTION

Figure 1:
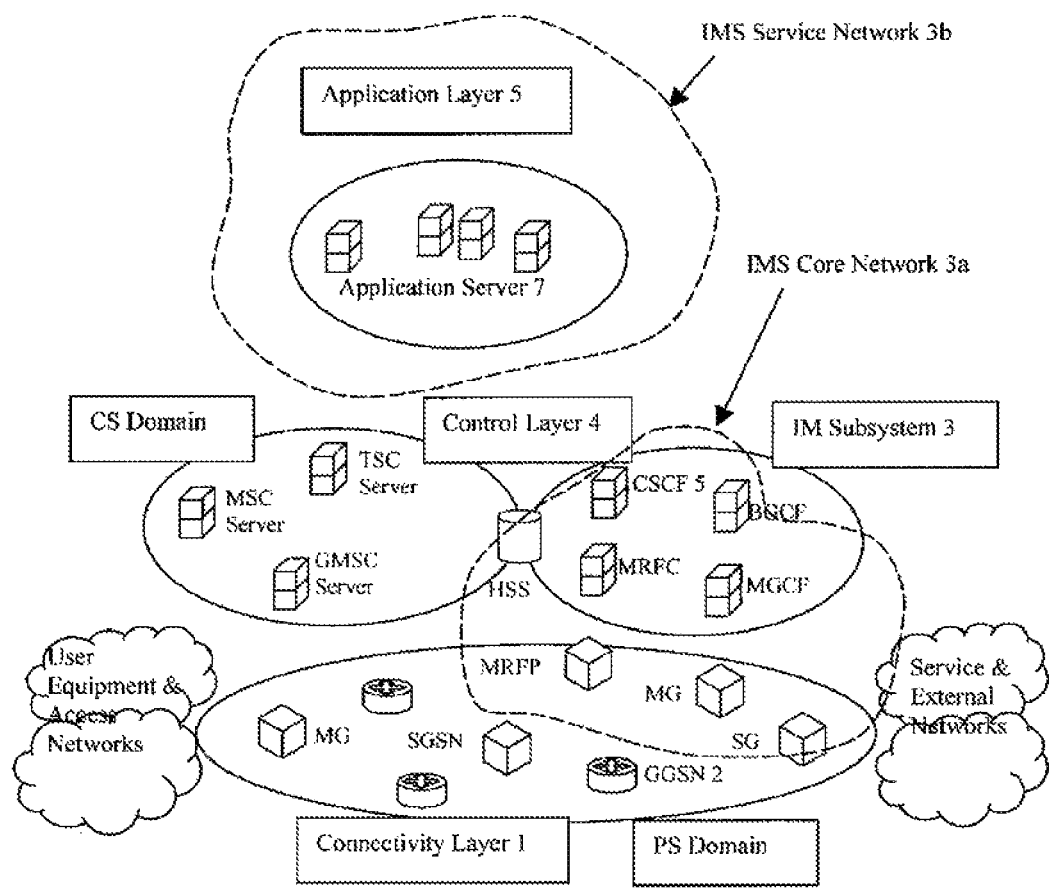
FIG. 1 (PRIOR ART), discussed hereinbefore, illustrates schematically the integration of an IP Multimedia Subsystem into a 3G mobile communications system.
Figure 2:
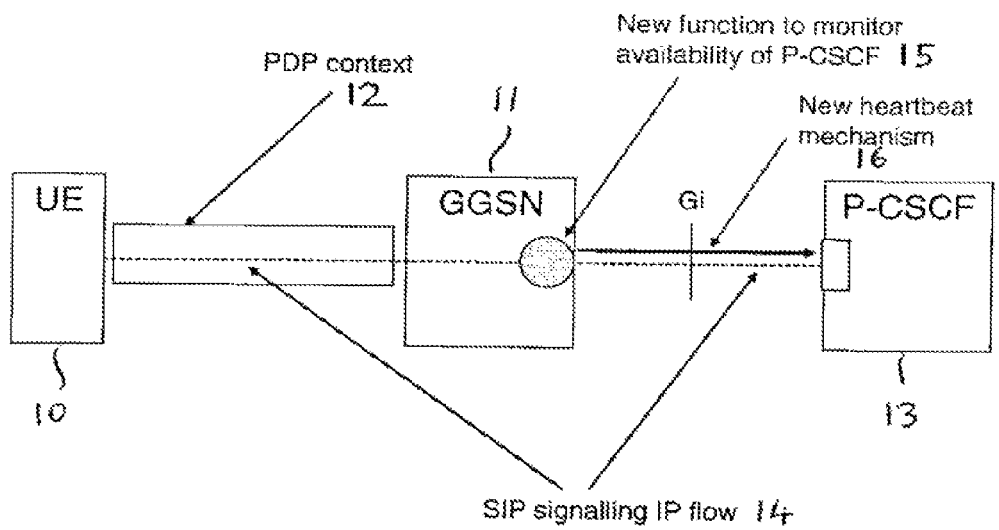
FIG. 2 illustrates the structure and signalling in relation to a GGSN constituting an embodiment of the invention and performing a method constituting an embodiment of the invention.

FIG. 2 illustrates part of the system shown in FIG. 1 (PRIOR ART) connected to user equipment 10. The network comprises a gateway GPRS support node (GGSN) 11. The GGSN 11 is one of a plurality of such gateways with each being associated with a plurality of user equipments 10 by means of a packet data protocol (PDP) context 12.

FIG. 2 illustrates the situation where the user equipment 10 has registered with a proxy Call Session Control Function (P-CSCF) 13. The user equipment 10 communicates with the P-CSCF 13 via the GGSN 11 by means including session initiating protocol (SIP) signalling internet protocol (IP) flow 14.

The GGSN 11 includes a new function 15 which monitors the availability of the P-CSCF 13. The new function 15 provides an indication if the signals, such as the flow 14, from the P-CSCF 13 to the GGSN 11 becomes unacceptable. The function 15 may perform statistical monitoring of the traffic from the P-CSCF 13 as described hereinafter with reference to FIG. 3. Alternatively or additionally, the function 15 may use a "heartbeat mechanism" 16 to monitor the response of the P-CSCF 13 to signals generated by the function 15, sent to the P-CSCF 13, and requiring a response from the P-CSCF. Such a heartbeat mechanism is described hereinafter with reference to FIG. 4.

In general terms, the function 15 monitors the signal flow from the P-CSCF 13 and provides an indication of unacceptability in response to a change in the signal flow which is characteristic of the unavailability of the sender, such as an interruption in the monitored signals. The function 15 then takes appropriate action to signal the unavailability of the P-CSCF 13, for example causing the or each user equipment 10 to initiate a re-registration with a different P-CSCF which is currently known or believed to be available.

The function 15 needs to know which P-CSCF's such as 13, to monitor as there is no fixed connection between the GGSN 11 and the P-CSCF's. In examples of such a system where the addresses of P-CSCF's, which are currently associated with user equipments connected to the GGSN 11, are stored in the GGSN 11, the function 15 may monitor the addresses of the P-CSCF's currently stored in the GGSN 11. Alternatively or additionally, the function 15 may inspect the destination address of the IP flow marked as used for signalling. Such marking may be performed by the user equipment in GPRS session management signalling as set out in 3GPP TS 24.008. Such marking may also be done by PCRF over Gx, which is a new mechanism.

Figure 3:
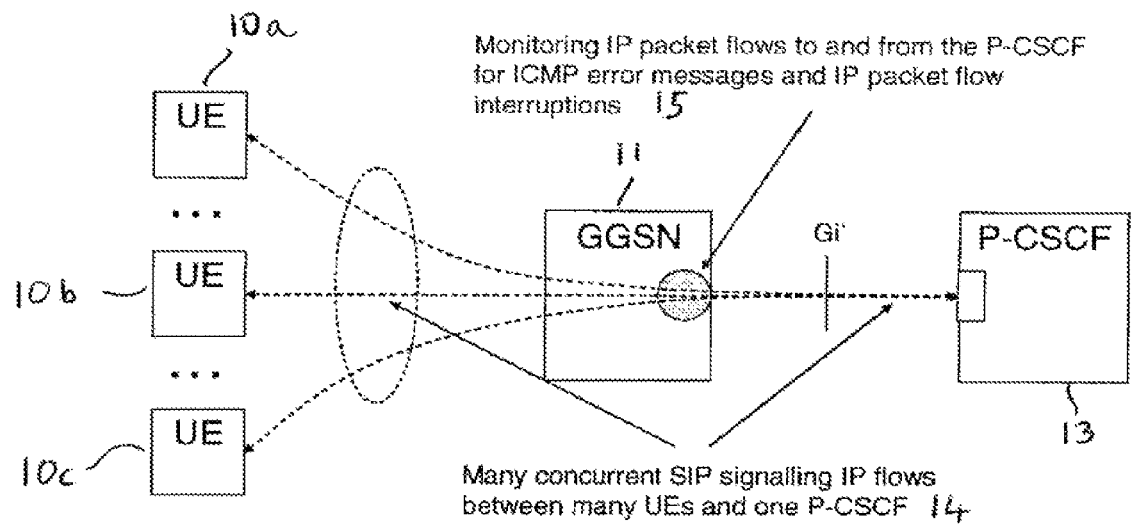
FIG. 3 is similar to FIG. 2 and illustrates a first technique for monitoring availability of a P-CSCF.

As mentioned hereinbefore, FIG. 3 illustrates the statistical monitoring technique for determining the availability of the P-CSCF 13. This technique is based on the fact that the GGSN 11 typically handles the signalling of many user equipments 10a, 10b, 10c towards the P-CSCF 13. Thus, statistically there will be a nearly continuous flow of IP packets to and from the P-CSCF 13 through the GGSN 11. The function 15 may therefore determine that the P-CSCF has failed when it receives an ICMP indicating that the address of the P-CSCF 13 is unreachable or when the flow of packets from the P-CSCF 13 to all user equipments associated therewith is interrupted for an unacceptable period of time. This period of time may be determined in any suitable way and may, for example, be dynamically adjusted according to the number of signalling IP flows which the GGSN 11 is handling for the P-CSCF 13 which corresponds to the number of user equipments 10a, 10b, 10c signalling with the P-CSCF 13. This period of time may be dynamically adjusted according to the measurement of the signalling IP packet flows from and/or to the P-CSCF 13. This period of time may be preconfigured to reflect signalling traffic predictions for the GGSN 11. This period of time may be determined by means of a combination of any of these methods. This period is also based on the required maximum delay to discover the unavailability of the P-CSCF 13.

The function 15 is typically capable of monitoring the availability of a plurality of P-CSCF's at the same time so as to provide early and reliable signalling of a failure affecting any of the user equipments connected to the GGSN 11. The function separately monitors the signalling flow associated with each P-CSCF in order to perform the statistical monitoring described herein before and/or the heartbeat mechanism described hereinafter.

Figure 4:
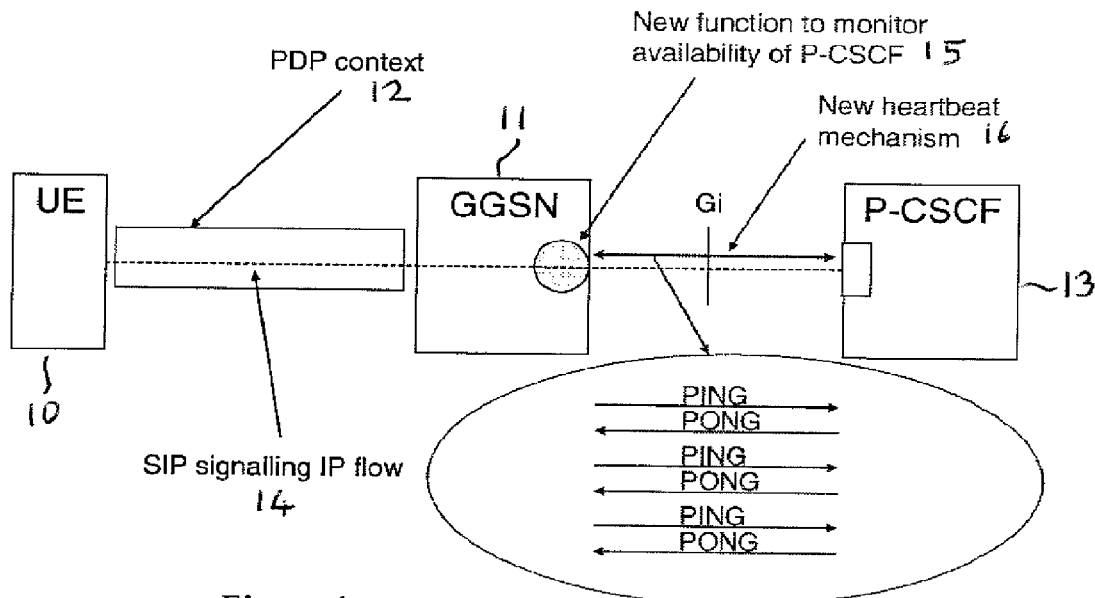
FIG. 4 is similar to FIG. 2 and illustrates another technique for monitoring the availability of the P-CSCF.

The heartbeat mechanism is illustrated in FIG. 4. The function 15 periodically sends an IP packet or "ping" to the (or each) P-CSCF 13. The IP packet is arranged to require a response from the P-CSCF 13 back to the GGSN 11. Thus, if the P-CSCF 13 is available and is functioning correctly, it responds to the ping with a response IP packet or "pong", which it sends back to the GGSN 11. The function 15 watches for the returning pong as a result of each ping. Lack of one or more responses in the form of pongs from the P-CSCF is judged as a P-CSCF failure.

The heartbeat mechanism provides a more general technique for monitoring the availability of the P-CSCF because it may be used irrespective of the number of user equipment signalling IP flows. The heartbeat mechanism does generate additional signal load on the GGSN 11 and the P-CSCF 13, whereas the statistical monitoring does not alter the load as it makes use of the existing signal flows. However, the statistical monitoring requires a minimum of aggregate signalling traffic in order to perform reliably.

Although either technique may be performed on its own, both techniques may be performed simultaneously or may be combined in such a way that statistical monitoring is used when the signalling traffic is sufficient whereas the heartbeat mechanism is used when the signalling traffic is insufficient. The function 15 may switch between these techniques at any time, for example in accordance with signalling traffic.

In order to facilitate recovery from a failure (or other unavailability) of the P-CSCF 13, the GGSN 11 may take any, or any combination, of a variety of measures. Typically, these measures are used to notify the or each user equipment previously registered with the failed or unavailable P-CSCF. The user equipment may then register with another P-CSCF which is currently available.

The GGSN 11 may notify the user equipment 10 by removing the signalling IP flows using the PDP context modification procedure to the user equipment, for example in accordance with the existing procedure defined in 3GPP TS 24.008. The GGSN 11 may delete the PDP context 12 carrying the signalling flows using the PDP context deactivation procedure, which is also defined in 3GPP TS 24.008. The GGSN 11 may send a new explicit notification in the GPRS session management signalling not currently defined in 3GPP TS 24.008, that the destination (the P-CSCF 13) of the signalling IP flow has failed. The GGSN may send an ICMP (internet control message protocol) message with an indication that the destination IP address (of the P-CSCF) is unreachable, in accordance with IETF RFC 722.

Figure 5:
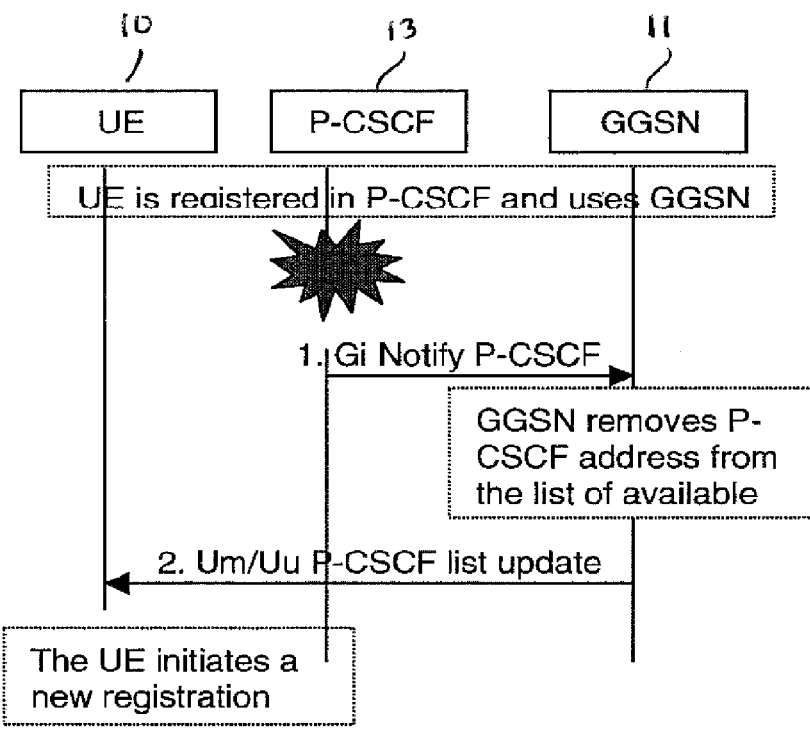
FIG. 5 illustrates the IMS signalling associated with recovery from a P-CSCF failure.

FIG. 5 illustrates a modified technique for monitoring and reacting to the availability of the P-CSCF 13. The GGSN 11 retains or stores information about which P-CSCF's addresses are allocated to the user equipments 10 connected to the GGSN 11. The GGSN monitors traffic with the P-CSCF at each of these stored addresses, for example by using the statistical monitoring or the heartbeat mechanism. If the monitoring determines that one of the P-CSCF's has failed or has become unavailable, the GGSN 11 provides a modified announcement to the user equipments as to which P-CSCF's addresses are valid by withdrawing the or each address which is no longer available. The user equipment affected by this then initiates an IMS re-registration using the P-CSCF addresses provided in the modified announcement. When using the heartbeat monitoring mechanism, the latency from P-CSCF failure to re-registration depends primarily on the frequency of the heartbeat traffic and the pace at which modified announcements may be made towards the affected user equipments.

Referring to FIG. 5, the GGSN 11 is configured according to 3 GGP TS 29.061 to provide P-CSCF addresses to the user equipments such as 10. The GGSN 11 performs the heartbeat technique, which may be a new SIP/SDP procedure within the IMS framework or an IP protocol-based procedure, for example using the ICMP protocol. For example, this may be a periodic echo traffic on GGSN initiative or the GGSN subscribing (SIP SUBCRIBE) to a "heart beat" event from the P-CSCF, which issues the corresponding notification (SIP NOTIFY) periodically. If a P-CSCF failure is detected, the GGSN 11 determines which IP-CAN (connectivity access network) sessions are affected.

In accordance with a first subsequent procedure, the GGSN 11 determines the new P-CSCF address or addresses for the affected IP-CAN sessions and issues, for each of them, a "modified PDP context" for the PDP context in which the original address or addresses were published. Should that PDP context no longer exist, either the dedicated signalling PDP context or any other context may be used. The only modifications for the PDP context are the PCO (protocol configuration options) field within the P-CSCF address or addresses and, if the bearer control mode permits it and if necessary, the TFT (traffic flow template) filters for a dedicated signalling context are adjusted to the new situation. The user equipment responds to the PDP context modification by issuing an IMS registration request to a new P-CSCF.

The latency from the P-CSCF failure to the user equipment having re-registered includes up to one heartbeat cycle, the GGSN delay in sending the "modify PDP context" (as the number of simultaneously ongoing modifications may be limited), and the user equipment response time.

In accordance with a second subsequent procedure where the user equipment is configured to re-establish IMS registration when the IP-CAN session terminates, terminating the affected IP-CAN sessions, for example by deactivating all PDP contexts, causes the user equipments to establish a new IP-CAN session and to re-register with the IMS. Under this procedure, the user equipment will normally receive a different IP address and all the IMS services will terminate. In this case, typical latency from the failure of the P-CSCF to re-registration includes up to one cycle of the heartbeat mechanism, the GGSN delay in sending the "delete PDP context" (as the number of simultaneously ongoing modifications may be limited), and the user equipment response time.

Where the user equipment does not have the capability of responding merely to the sending of a new set of valid P-CSCF addresses, the use of this technique may be made conditional so that the user equipment declares support (PCO field) in connection with requesting the P-CSCF address in the first place.

It is possible for the GGSN 11 to monitor the health of the P-CSCF 13 through the Gi Interface in accordance with 3GPP TS 29.061. The signal flow for this is illustrated in FIG. 5. The monitoring may include some additional explicit signalling with an indication of a P-CSCF restart. In the event of P-CSCF unavailability, the GGSN may remove the corresponding P-CSCF address from the list of addresses sent to the user equipments. In the event of a P-CSCF restart, the GGSN may send an indication to the user equipment with the list of P-CSCF addresses that are available so as to initiate a new registration.

An alternative for monitoring the health of the P-CSCF within the GGSN is to implement a heartbeat similar to the Echo Request, which is available in GTP between the GGSN and a SGSN (serving GPRS support node), as described in 3GPP TS 29/060 (clause 7.2). This allows for the detection of unavailability by detecting the lack of response to an Echo Request, and a restart, comprising an Echo Response with an incremented Restart Counter.

The invention claimed is:

1. A method of facilitating recovery from a failure of a proxy call session control function within an IP multimedia subsystem network, the method comprising the steps of:
   monitoring, in a gateway of a packet switched access network used by user equipment to access the IP multimedia subsystem network, signals arriving at the gateway from the proxy call session control function;
   providing an indication in the gateway after a predetermined delay from receipt of the monitored signals, wherein the predetermined delay is a function of signal traffic level from the or each user equipment via the gateway intended for the proxy call session control function; and
   performing an action in the gateway, in response to the indication, which signals the unavailability of the proxy call session control function to the or each user equipment which is associated with the proxy call session control function.

2. A method of facilitating recovery from a failure of a proxy call session control function within an IP multimedia subsystem network, the method comprising the steps of:
   monitoring, in a gateway of a packet switched access network used by user equipment to access the IP multimedia subsystem network, signals arriving at the gateway from the proxy call session control function, wherein the monitoring step comprises sending to the proxy call session control function a signal requiring the proxy call session control function to send a response to the gateway, and wherein the response requiring signal is sent if signal traffic between the gateway and the proxy call session control function is below a predetermined level;
   providing an indication in the gateway in response to failure to receive, at the gateway, a predetermined number of responses; and
   performing an action in the gateway, in response to the indication, which signals the unavailability of the proxy call session control function to the or each user equipment which is associated with the proxy call session control function.

3. A method of facilitating recovery from a failure of a proxy call session control function (P-CSCF) within an Internet Protocol (IP) multimedia subsystem network, the method implemented by a gateway comprising the steps of:

monitoring, in the gateway of a packet switched access network used by a plurality of user equipments to access the IP multimedia subsystem network, IP packet flows between the P-CSCF and the plurality of user equipments which are associated with the P-CSCF, wherein the monitoring step comprises:

determining that the P-CSCF has failed when the gateway monitors an Internet Control Message Protocol (ICMP) error message indicating that an address of the P-CSCF is unreachable; and determining the IP packet flows from the P-CSCF to the plurality of user equipments are interrupted for a period of time;

providing an indication in the gateway if the monitored IP packet flows indicate an unavailability of the P-CSCF; and performing an action in the gateway, in response to the indication, which signals the unavailability of the P-CSCF to the plurality of user equipments which are associated with the P-CSCF.

4. A gateway of a packet switch access network used by a plurality of user equipments for facilitating recovery from a failure of a proxy call session control function (P-CSCF) within an Internet Protocol (IP) multimedia subsystem network, the gateway comprising:

a processor; and a memory that stores processor-executable instructions where the processor interfaces with the memory and executes the processor-executable instructions to perform operations as follows:

monitor IP packet flows between the P-CSCF and the plurality of user equipments which are associated with the P-CSCF, wherein the monitor operation comprises following operations:

determine that the P-CSCF has failed when the gateway monitors an Internet Control Message Protocol (ICMP) error message indicating that an address of the P-CSCF is unreachable; and determine the IP packet flows from the P-CSCF to the plurality of user equipments are interrupted for a period of time;

provide an indication in the gateway if the monitored IP packet flows indicate an unavailability of the P-CSCF; and perform an action in the gateway, in response to the indication, which signals the unavailability of the P-CSCF to the plurality of user equipments which are associated with the P-CSCF.

5. A method of facilitating recovery from a failure of a proxy call session control function (P-CSCF) within an Internet Protocol (IP) multimedia subsystem network, the method implemented by a gateway comprising the steps of:

monitoring, in the gateway of a packet switched access network used by a user equipment to access the IP multimedia subsystem network, an IP packet flow between the P-CSCF and the user equipment which is associated with the P-CSCF, wherein the monitoring step comprises:

periodically sending an IP packet to the P-CSCF, where the IP packet is arranged to require a response from the P-CSCF back to the gateway;

providing an indication in the gateway if the P-CSCF failed to send one or more response IP packets in response to the periodically sent one or more IP packets which indicates an unavailability of the P-CSCF; and performing an action in the gateway, in response to the indication, which signals the unavailability of the P-CSCF to the user equipment which is associated with the P-CSCF.

6. A gateway of a packet switch access network used by a user equipment for facilitating recovery from a failure of a proxy call session control function (P-CSCF) within an Internet Protocol (IP) multimedia subsystem network, the gateway comprising:

a processor; and a memory that stores processor-executable instructions where the processor interfaces with the memory and executes the processor-executable instructions to perform operations as follows:

monitor an IP packet flow between the P-CSCF and the user equipment which is associated with the P-CSCF, wherein the monitor operation comprises:

periodically sending an IP packet to the P-CSCF, where the IP packet is arranged to require a response from the P-CSCF back to the gateway;

provide an indication in the gateway if the P-CSCF failed to send one or more response IP packets in response to the periodically sent one or more IP packets which indicates an unavailability of the P-CSCF; and perform an action in the gateway, in response to the indication, which signals the unavailability of the P-CSCF to the user equipment which is associated with the P-CSCF.

7. The method according to claim 3, further comprising dynamically adjusting the period of time according to measurements of the IP packet flows from and/or to the P-CSCF.

8. The method according to claim 3, further comprising pre-configuring the period of time to reflect signalling traffic predictions for the gateway.

9. The gateway according to claim 4, wherein the processor executes the processor-executable instructions to dynamically adjust the period of time according to measurements of the IP packet flows from and/or to the P-CSCF.

10. The gateway according to claim 4, wherein the processor executes the processor-executable instructions to pre-configure the period of time to reflect signalling traffic predictions for the gateway.

11. The gateway according to claim 4, in which the gateway is a gateway support node for a general packet radio service.

12. The gateway according to claim 11, in which the action is performed by session management signaling.

13. The gateway according to claim 12, in which the action comprises removing traffic flow templates corresponding to the signalling IP flows to the plurality of user equipments.

14. The gateway according to claim 12, in which the action comprises deleting Packet Data Protocol (PDP) contexts carrying signaling IP flows to the plurality of user equipments.

15. The gateway according to claim 12, in which the action comprises sending notification in General Packet Radio Service (GPRS) session management.

16. The gateway according to claim 12, in which the action comprises sending an Internet Control Message Protocol (ICMP) message indicating that the destination IP address is unreachable.

17. The gateway according to claim 12, in which the action comprises informing the plurality of user equipments of which proxy call session control functions are available.

18. The gateway according to claim 4, in which at least one of the plurality of user equipments responds to the action by performing a re-registration with the IP multimedia subsystem network including associating the at least one of the plurality of user equipments with another proxy call session control function.

19. The gateway according to claim 4, in which the monitoring operation comprises monitoring, in the gateway, signals arriving at the gateway from each proxy call session control function whose address is stored at the gateway.

20. The gateway according to claim 4, in which the gateway is a general packet radio service support node (GGSN).

21. The method according to claim 5, in which the gateway is a gateway support node for a general packet radio service.

22. The method according to claim 21, in which the action performing step comprises performing the action by means of session management signaling.

23. The method according to claim 22, in which the action comprises removing traffic flow templates corresponding to the signalling IP flows to the user equipment.

24. The method according to claim 22, in which the action comprises deleting a Packet Data Protocol (PDP) context carrying signaling IP flows to the user equipment.

25. The method according to claim 22, in which the action comprises sending notification in General Packet Radio Service (GPRS) session management.

26. The method according to claim 22, in which the action comprises sending an Internet Control Message Protocol (ICMP) message indicating that the destination IP address is unreachable.

27. The method according to claim 22, in which the action comprises informing the user equipment of which proxy call session control functions are available.

28. The method according to claim 5, in which the user equipment responds to the action by performing a re-registration with the IP multimedia subsystem network including associating the user equipment with another proxy call session control function.

29. The method according to claim 5, in which the monitoring step comprises monitoring, in the gateway, signals arriving at the gateway from each proxy call session control function whose address is stored at the gateway.

30. The method according to claim 5, in which the gateway is a general packet radio service support node (GGSN).

31. The gateway according to claim 6, in which the gateway is a gateway support node for a general packet radio service.

32. The gateway according to claim 31, in which the action performing operation comprises performing the action by means of session management signaling.

33. The gateway according to claim 32, in which the action comprises removing traffic flow templates corresponding to the signalling IP flows to the user equipment.

34. The gateway according to claim 32, in which the action comprises deleting a Packet Data Protocol (PDP) context carrying signaling IP flows to the user equipment.

35. The gateway according to claim 32, in which the action comprises sending notification in General Packet Radio Service (GPRS) session management.

36. The gateway according to claim 32, in which the action comprises sending an Internet Control Message Protocol (ICMP) message indicating that the destination IP address is unreachable.

37. The gateway according to claim 32, in which the action comprises informing the user equipment of which proxy call session control functions are available.

38. The gateway according to claim 6, in which the user equipment responds to the action by performing a re-registration with the IP multimedia subsystem network including associating the user equipment with another proxy call session control function.

39. The gateway according to claim 6, in which the monitoring operation comprises monitoring, in the gateway, signals arriving at the gateway from each proxy call session control function whose address is stored at the gateway.

40. The gateway according to claim 6, in which the gateway is a general packet radio service support node (GGSN).

41. The method according to claim 3, in which the gateway is a gateway support node for a general packet radio service.

42. The method according to claim 41, in which the action performing step comprises performing the action by means of session management signaling.

43. The method according to claim 42, in which the action comprises removing traffic flow templates corresponding to the signalling IP flows to the plurality of user equipments.

44. The method according to claim 42, in which the action comprises deleting Packet Data Protocol (PDP) contexts carrying signaling IP flows to the plurality of user equipments.

45. The method according to claim 42, in which the action comprises sending notification in General Packet Radio Service (GPRS) session management.

46. The method according to claim 42, in which the action comprises sending an Internet Control Message Protocol (ICMP) message indicating that the destination IP address is unreachable.

47. The method according to claim 42, in which the action comprises informing the plurality of user equipments of which proxy call session control functions are available.

48. The method according to claim 3, in which at least one of the plurality of user equipments responds to the action by performing a re-registration with the IP multimedia subsystem network including associating the at least one of the plurality of user equipments with another proxy call session control function.

49. The method according to claim 3, in which the monitoring step comprises monitoring, in the gateway, signals arriving at the gateway from each proxy call session control function whose address is stored at the gateway.

50. The method according to claim 3, in which the gateway is a general packet radio service support node (GGSN).

* * * * *